(12) United States Patent
Wang et al.

(10) Patent No.: US 8,437,269 B2
(45) Date of Patent: May 7, 2013

(54) UPLINK SCHEDULING DSF WIRELESS NETWORKS

(75) Inventors: Min Wang, Luleå (SE); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 298 days.

(21) Appl. No.: 12/867,891

(22) PCT Filed: Feb. 19, 2008

(86) PCT No.: PCT/CN2008/000363
§ 371 (c)(1),
(2), (4) Date: Sep. 7, 2010

(87) PCT Pub. No.: WO2009/103183
PCT Pub. Date: Aug. 27, 2009

(65) Prior Publication Data
US 2011/0044192 A1      Feb. 24, 2011

(51) Int. Cl.
G01R 31/08        (2006.01)
(52) U.S. Cl.
USPC .......................................... 370/252; 370/329
(58) Field of Classification Search .................. 370/252, 370/329–334; 455/450–454
See application file for complete search history.

(56) References Cited

U.S. PATENT DOCUMENTS

| 5,684,791 | A | * | 11/1997 | Raychaudhuri et al. | ... 370/310.2 |
| 7,158,804 | B2 | * | 1/2007 | Kumaran et al. | ............. 455/515 |
| 2006/0246847 | A1 | * | 11/2006 | Kim et al. | ....................... 455/69 |
| 2009/0097444 | A1 | * | 4/2009 | Lohr et al. | .................... 370/329 |

FOREIGN PATENT DOCUMENTS

| CN | 1373568 A | 10/2002 |
| CN | 1972177 A | 5/2007 |
| GB | 2403378 A | 12/2004 |

* cited by examiner

Primary Examiner — Hassan Kizou
Assistant Examiner — Hashim Bhatti
(74) Attorney, Agent, or Firm — Coats & Bennett, P.L.L.C.

(57) ABSTRACT

In network-based uplink scheduling, users are scheduled by the network for uplink communication between a user side and a network side. In this context, the invention provides an efficient estimation of User Equipment (UE) buffer status on the network side such as at Node B (20), for each of a number of users (10), and determines an uplink scheduling priority order of the users based on the network-estimated buffer status information. The users (10) are allocated communication resources based on the determined uplink scheduling priority order. In this way, the UE buffer status may be considered in the uplink scheduling procedure without explicit UE buffer status reports (that would waste valuable uplink transmission resources) from the UE side. This means that efficient scheduling and optimal exploitation of the uplink transmission resources are ensured, with clearly improved system performance as a result.

25 Claims, 11 Drawing Sheets

| UE ID | Logical channel ID | Flag (silence or talk) | Time base (TB) | First Received MAC-es Sequence Number (FRS) | Largest Received MAC-es Sequence Number (LRS) |
|---|---|---|---|---|---|
| | | | | | |

Fig. 7

UPLINK SCHEDULING DSF WIRELESS NETWORKS

TECHNICAL FIELD

The present invention generally relates to wireless communication systems, and more particularly to uplink scheduling of users in a wireless network.

BACKGROUND

In wireless communication systems, the process of scheduling users for communication plays an important role for the overall performance. Scheduling is normally part of the general resource management, and typically involves allocating communication resources, such as the transmission resources of a shared radio medium, to users according to some priority order.

Scheduling is of outmost importance in many wireless applications and system environments such as the IP Multimedia Subsystem (IMS) that supports user-to-user communication services. For example, real-time user-to-user multimedia telephony (MMTel) services play a key role to satisfy the needs of different services and to improve perceptual quality. In particular, when a lot of users enjoy the services, the available communication resources need to be allocated efficiently. This requires an efficient strategy and implementation for scheduling user access to the communication resources.

In modern communication systems such as packet based wireless systems, like High Speed Packet Access (HSPA) systems with Enhanced. Uplink (EUL), or Long Term Evolution (LTE) systems, the scheduler is a key element to provide higher data rates, reduced latency and improved system capacity.

There is thus a general demand for efficient scheduling in wireless communications.

RELATED ART

Reference [1] relates to a method for scheduling a data transmission to a User Equipment (UE) in a communication system comprising at least one radio network controller (RNC) governing a number of base stations, wherein the communication system supports data transmission from a base station to a UE on a High Speed Packet Access (HSPA) bearer or a dedicated channel (DHC) or on similar bearers in a CDMA2000 system.

Reference [2] relates to a method of scheduling data packets for transmission from a first terminal to a second terminal over a channel shared with other terminals comprising monitoring a time interval from accepting a packet for transmission and scheduling the packet for transmission. If the transmission is unsuccessful, the packet is scheduled for retransmission within a predetermined time. The predetermined time is selected dependent upon the time interval.

Reference [3] describes a method of improved media frame transmission in a communication network. Initially, a plurality of original or regular media frames is provided for transmission. Robust representations of the provided regular media frames are generated and stored locally. Subsequently, one or more of the regular media frames is/are transmitted. An indication of a loss of a transmitted media frame is detected, and a stored robust representation of the lost media frame and/or a stored robust representation of a subsequent, not yet transmitted, media frame is/are transmitted in response to a detected frame loss to increase the media quality.

SUMMARY

It is a general object of the present invention to provide an improved strategy for uplink scheduling of users for uplink communication in a wireless communication network.

In particular it is desirable to provide a network-based method and arrangement for uplink scheduling.

It is also a specific object to provide a scheduling node for a wireless communication network.

These and other objects are met by the invention as defined by the accompanying patent claims.

The invention basically relates to network-based uplink scheduling of users for uplink communication between a user side and a network side in a wireless communication network.

In this context, a basic idea of the invention is to provide an efficient estimation of User Equipment (UE) buffer status on the network side, for each of a number of users, and determine an uplink scheduling priority order of the users based on the network-estimated buffer status information, and allocate communication resources to the users based on the determined uplink scheduling priority order.

In this way, the UE buffer status may be considered in the uplink scheduling procedure without explicit UE buffer status reports (that would waste valuable uplink transmission resources) from the UE side. This means that efficient scheduling and optimal exploitation of the uplink transmission resources are ensured, with clearly improved system performance as a result.

The invention covers at least a scheduling method, a corresponding scheduling arrangement and a scheduling node.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which:

FIG. 7 is a schematic diagram illustrating an example of a table for storing transmission sequence number information and related information according to an exemplary embodiment of the invention.

DETAILED DESCRIPTION

Figure 1:
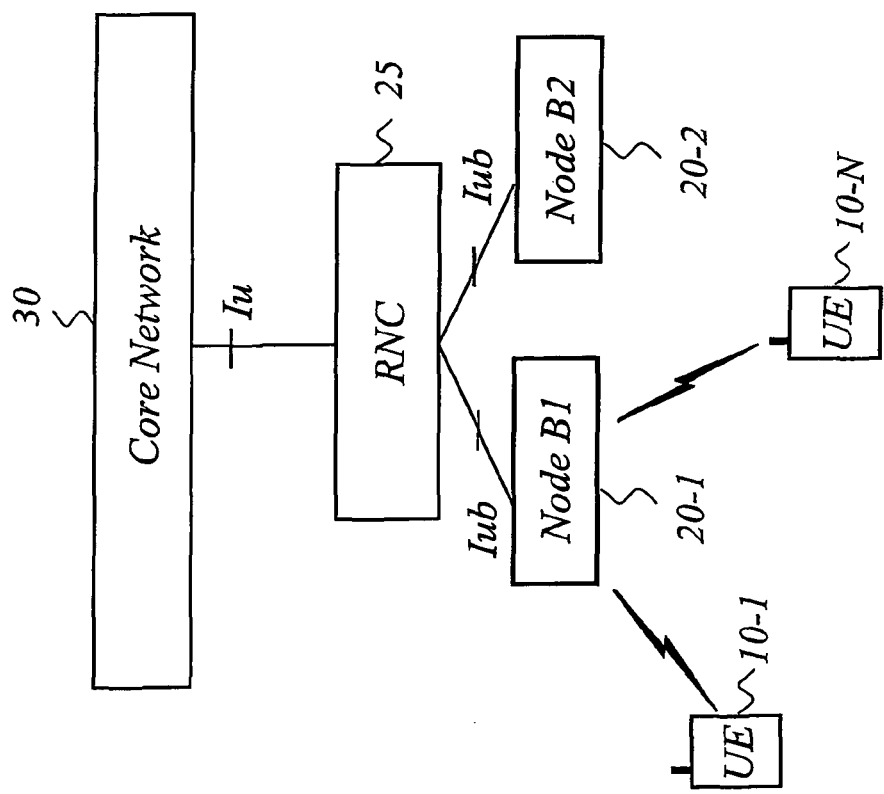
FIG. 1 is a schematic overview of an illustrative communication network for wireless communications.

Throughout the drawings, the same reference characters will be used for corresponding or similar elements.

FIG. 1 illustrates a simple overview of a typical wireless communication network including connection to a core network. Those familiar with UMTS Radio Access Network (UTRAN) and Wideband Code Division Multiple Access (WCDMA) will recognize that FIG. 1 corresponds to the basic UTRAN architecture having a core network 30, a radio network subsystem with a (drift and/or serving) Radio Network Controller (RNC) 25 and associated Node Bs 20-1 and 20-2 for wireless communication with different User Equipment (UE) 10-1 and 10-2.

For a better understanding of the invention, it may be useful to continue with a brief general overview of user scheduling in an exemplary network environment like a modern/future wireless communication system such as High Speed Packet Access (HSPA) or Long Term Evolution (LTE) systems.

In many communication systems, scheduling of users is performed from the network side, and is therefore sometimes referred to as network-based multi-user scheduling. For example, in previous generation systems, scheduling normally worked as an operation unit in the network controller. With HSPA and similar modern systems, scheduling was relocated to Node B.

For example, HSPA is generally based on High Speed Downlink Packet Access (HSDPA) in the downlink and Enhanced Uplink (EUL) in the uplink. The Enhanced Uplink (EUL) is sometimes referred to as High Speed Uplink Packet Access (HSUPA)

HSDPA is an enhancement to WCDMA that provides a smooth evolutionary path to higher data rates. HSDPA is specified in 3GPP release 5, and includes additional transport and control channels such as the High-Speed Downlink Shared Channel (HS-DSCH). EUL is specified in 3GPP release 6 and includes additional transport and control channels such as the Enhanced Dedicated Channel (E-DCH).

HSDPA (High Speed Data Packet Access) enables improvements in capacity and end-user perception by means of efficient sharing of common resources in the cell among many users, rapid adaptation of the transmission parameters to the instantaneous radio channel conditions, increased peak bit rates and reduced delays. Fast scheduling is a mechanism that selects which user(s) to transmit to in, a given Transmission Time Interval (TTI). The packet scheduler is a key element in the design of a HSDPA system as it controls the allocation of the shared resources among the users and to a great extent determines the overall behavior of the system. In fact, the scheduler decides which users to serve and, in close cooperation with the link adaptation mechanism, which modulation, power and how many codes should be used for each user. This produces the actual end-users bit rate and system capacity. The HS-DSCH downlink channel is shared between users using channel-dependent scheduling to take advantage of favorable channel conditions in order to make best use of the available radio resources.

As mentioned, scheduling typically involves allocating communication resources to users according to some priority order. The scheduling algorithm generally determines the priorities of the users by using one or more metrics. Delay factors and optionally other factors based on radio channel quality are normally used to grant scheduling priorities to the users. For example, for MMTel services, the delay in the wireless access network is an important metric. It is known that so-called delay-sensitive schedulers for the downlink can achieve rather good performance for MMTel services such as Voice over IP (VoIP) traffic.

Similarly to HSDPA in the downlink, there will be a packet scheduler for E-DCH in the uplink. However, unlike HSDPA where the scheduler and the transmission buffer(s) are all located in Node B, the data to be transmitted reside in the user equipment for the uplink case. The scheduler will normally operate on a request-grant principle, where the user equipment (UE) requests permission to send data and the scheduler on the network side decides when and how many terminals will be allowed to do so. A request for transmission will normally contain data about the state of the transmission data buffer and the queue at the terminal side and its available power margin. The standard foresees two basic scheduling methods. Long term grants are issued to several terminals which can send their data simultaneously using code multiplexation. Short term grants on the other hand allow multiplexing of terminals in the time domain.

In particular, for the Enhanced Uplink (EUL) the scheduler controls when and at what data rate the UE is allowed to transmit. By increasing the transmission power, the UE can transmit at a higher data rate. However, the received power from a certain UE represents interference for other UE terminals. Hence, the "shared resource" for the Enhanced Uplink is the amount of tolerable interference in the cell. To control the uplink interference, the scheduler at NodeB will allocate the UE with a value grant that corresponds to a maximum data rate.

A new MAC layer, MAC-e/es, is introduced in the UE and NodeB. In NodeB, MAC-e/es is responsible for support of fast Hybrid Automatic Repeat ReQuest (H-ARQ) retransmissions and scheduling, and in the UE, MAC-e/es is responsible for support of selecting the data rate within the limits set by the scheduler in NodeB.

Figure 2:
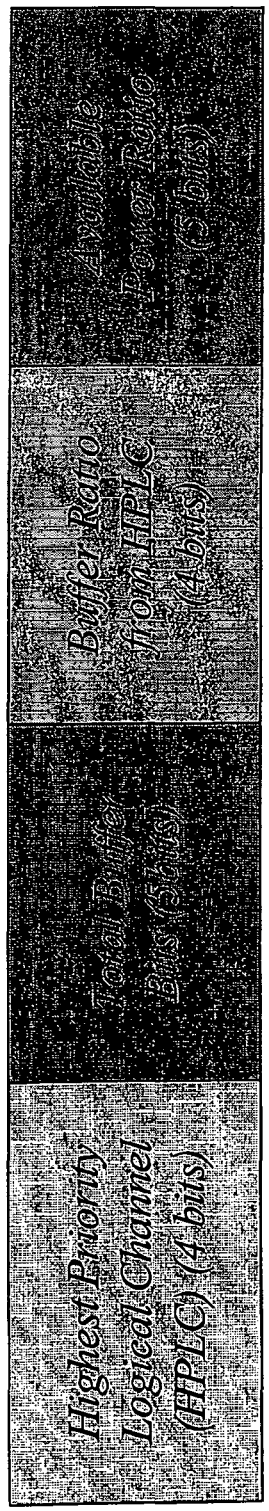
FIG. 2 is a schematic diagram illustrating the information fields in an in-band scheduling request.

The scheduler needs information about the UE status. Naturally, the more detailed the information, the better the possibilities for the scheduler: to take accurate and efficient decisions. In EUL, there are two mechanisms for transferring scheduling information from the UE to NodeB: out-band signaling and in-band signaling. Out-band signaling is done through a single so-called "happy bit" transmitted on the Enhanced Dedicated Physical Control CHannel (E-DPCCH). In-band signaling provides more detailed information, as illustrated in FIG. 2, and is transmitted on the Enhanced Dedicated Physical Data CHannel (E-DPDCH).

However, the amount of information sent in the uplink should be kept low in order not to consume excessive uplink capacity. For this reason, it is not feasible to send scheduling information on a regular up-to-date basis from the UEs to the network scheduler. For example, not even the limited out-band scheduling information can be transmitted to Node B periodically without wasting a large fraction of the shared uplink transmission resources. In practice, this means that the scheduler in NodeB can not track the UE buffer status such as the UE buffer queuing delay, at least not without wasting valuable transmission resources.

If the uplink scheduler only considers the granted rate and traffic Quality of Service (QoS) priority, without any buffer status report, the following effects may arise:

Users with longer queuing delay are set with lower priority. Then, packet delay may be increased without enough grants.

Users need more time to transmit buffered data without enough grants.

End to end performance of multimedia traffic is degraded.

Overall system capacity is decreased.

Thus, the analysis by the inventors reveals that there is a situation with seriously conflicting requirements, namely the need for detailed scheduling information on one hand and the need to optimally exploit the valuable uplink transmission resources on the other hand.

Figure 3:
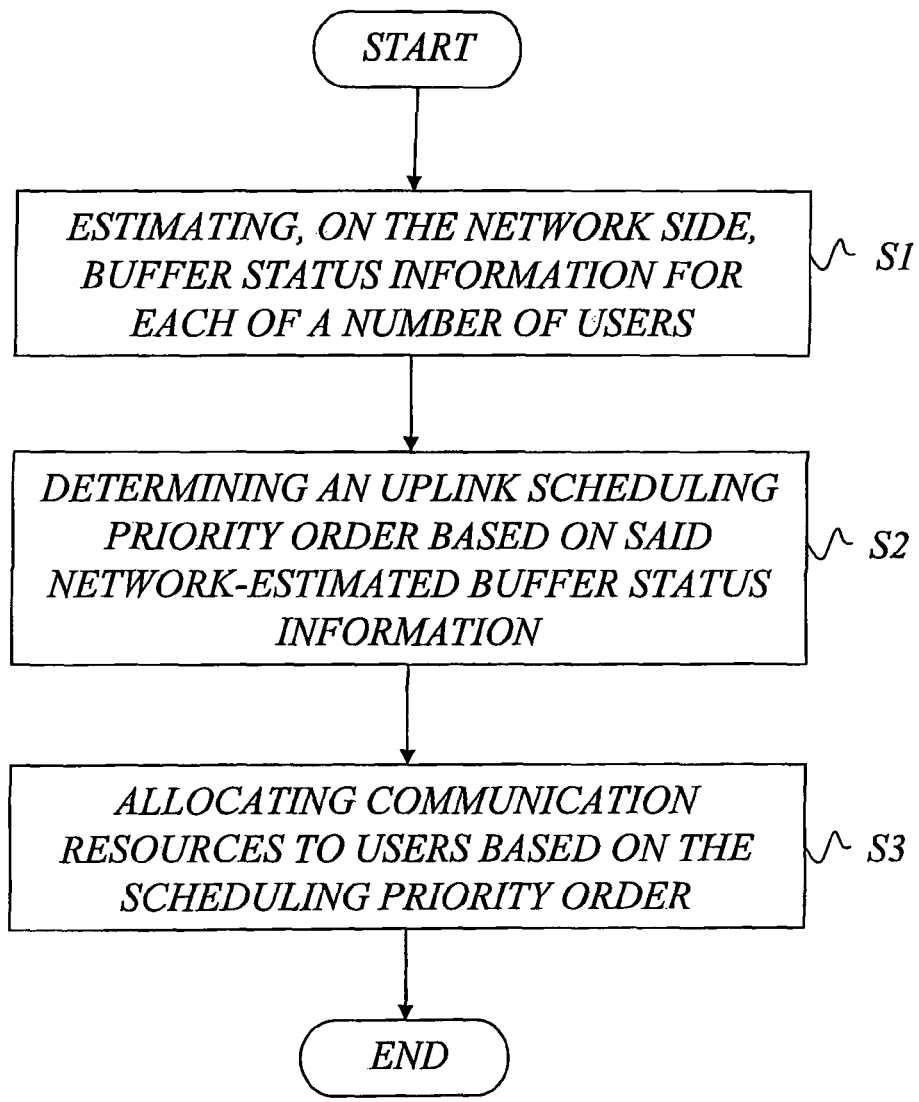
FIG. 3 is a schematic flow diagram of a method according to a preferred exemplary embodiment of the present invention

As schematically illustrated in FIG. 3, a basic idea of the present invention is to estimate (S1) the UE buffer status on the network side such as in NodeB or similar scheduling node without any explicit buffer status report from the UE side, and use the network-estimated UE buffer status for a number of corresponding users to determine (S2) an uplink scheduling priority order. The uplink communication resources are then allocated (S3) to the users based on the determined uplink scheduling priority order. The communication resources typically represent transmission resources of a shared radio medium in a radio access network.

In this way, the UE buffer status such as information related to UE buffer queuing delay and/or available UE buffer length may be considered in the uplink scheduling procedure without any explicit regular UE buffer status reports from the UE side. This means that efficient scheduling and optimal exploitation of the valuable uplink transmission resources are ensured, with clearly improved system performance as a result. Preferably, the UE buffer status is tracked continually in order to have reasonably up-to-date information about the buffer status in the corresponding user equipment.

For the case when the UE buffer status includes information on UE buffer queuing delay, the scheduling priority order may be determined by assigning higher priority to users having longer queuing delay. If the system is overloaded, users with smaller packet queuing delay are withdrawn with grant first, while if the system has available resources, users with longer packet queuing delay are allocated more grant first.

For the case when the UE buffer status includes information on available UE buffer length, the scheduling priority order may be determined by assigning higher priority to users having more available buffer length.

Other advantages that may be achieved include:

Reduced delay.

Less time needed to transmit buffered data.

End to end performance of multimedia traffic is improved.

Overall system capacity is increased.

In a preferred exemplary embodiment of the invention, an updated estimate of the UE buffer status is regularly determined based on Transmission Sequence Number (TSN) information already existing in data packets transmitted on the uplink from the user side. Preferably, the base station such as NodeB is configured for parsing headers of data packets from the user side to obtain the transmission sequence number information. In effect, this means that it is possible to continually track the UE buffer status so that accurate scheduling decisions may be taken.

It is for example possible to use a default priority order initially and then continue with the determined scheduling priority order based on buffer status estimation.

For example, information about the UE buffer status such as information concerning the UE buffer queuing delay or the available UE buffer length may be estimated based on a difference between a largest received sequence number and a first received sequence number per user and logical channel, as will be described in more detail later on. The first received and largest received sequence numbers are preferably associated with a given silence or talk period.

In the particular example of EUL, the E-DCH transport channel connects up to a new MAC sub-layer, MAC-e/es. In the UE, MAC-e/es are normally considered a single sub-layer, whereas on the network side, MAC-e and MAC-es are considered separate sub-layers.

Figure 4:
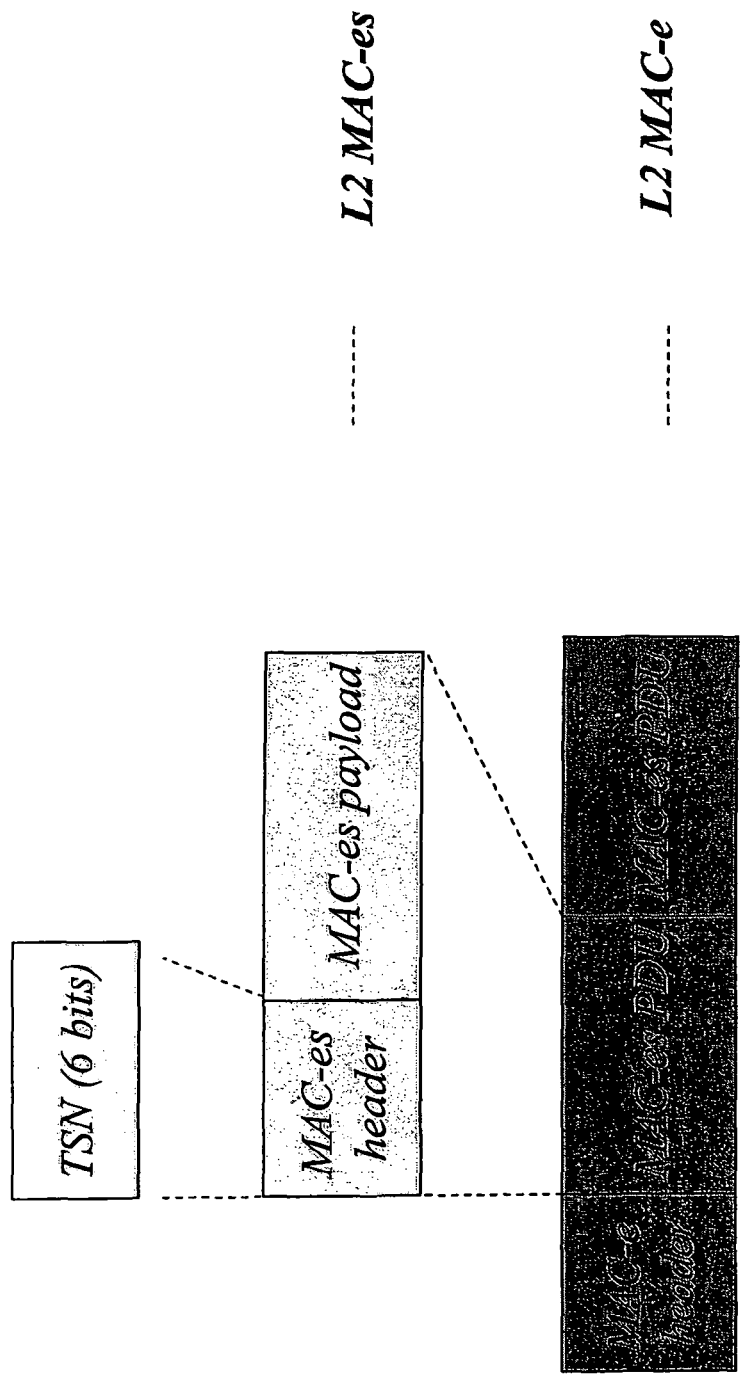
FIG. 4 is a schematic diagram illustrating a MAC-e Packet Data Unit (PDU) format.

FIG. 4 is a schematic diagram illustrating a MAC-e Packet Data Unit (PDU) format. A MAC-e PDU can be transmitted in a Transmission Time Interval (TTI), and the MAC-e PDU includes one or more MAC-es PDUs. Information is included in the MAC-e and MAC-es headers to control MAC multiplexing, reordering, scheduling and disassembly of MAC-e PDUs into individual MAC-es PDUs. As illustrated in FIG. 4, each MAC-es PDU transmitted from a UE includes a Transmission Sequence Number (TSN), which is incremented for each transmission on a logical channel. By ordering the MAC-es PDUs based on the TSN information, the RNC can provide in-sequence delivery to the Radio Link Control (RLC) entities.

The inventors have recognized the possibility of using the TSN information not only for reordering and providing in-sequence delivery, but also for estimating information representative of UE buffer status on the network side. This information may then be used for uplink scheduling as discussed above.

Figure 5:
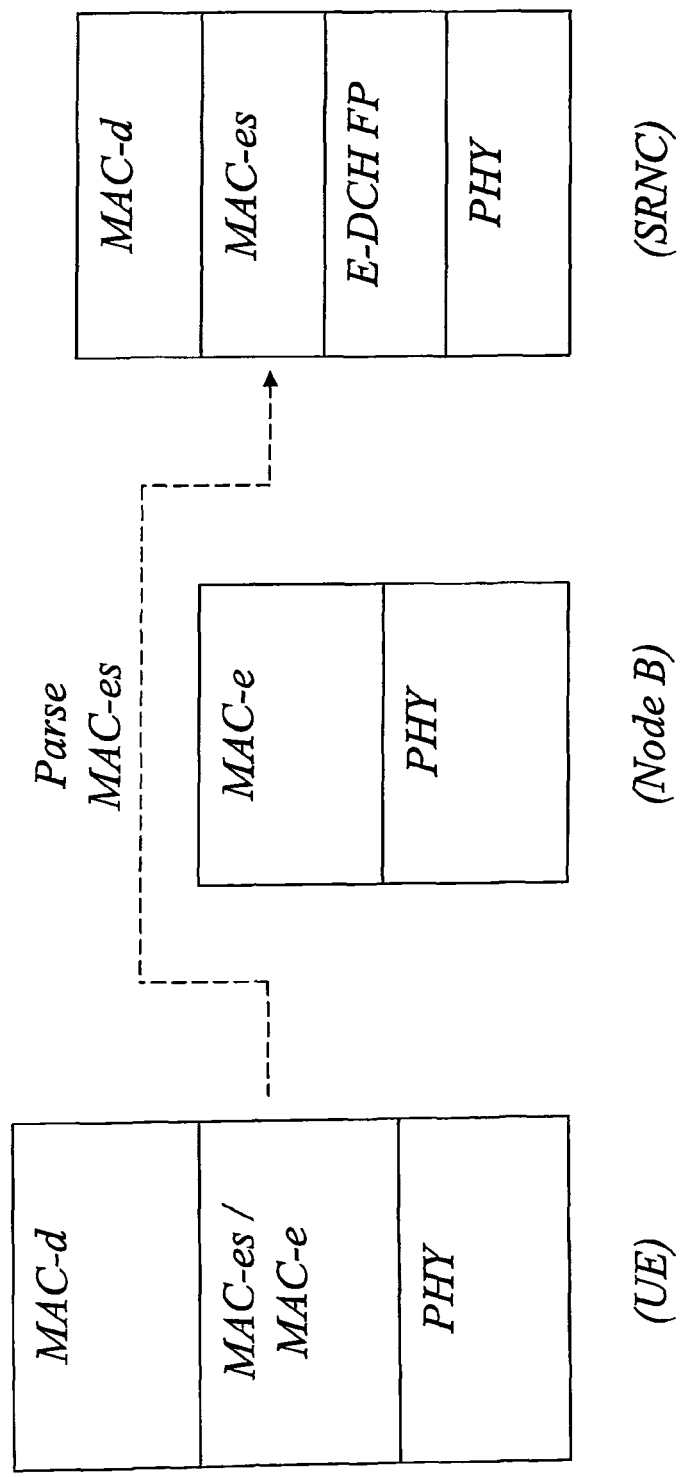
FIG. 5 is a schematic diagram illustrating an example of the protocol structure of different communicating entities.

As illustrated in FIG. 5, MAC-e and MAC-es are combined into a single sub-layer in the UE, while considered separate sub-layers on the network side. Normally, MAC-e is implemented in Node B and MAC-es in the RNC/SRNC (Serving RNC). This means that the TSN field and other related information belonging to the MAC-es layer can typically be seen at the RNC from the protocol layer point of view. If the scheduling functionality is provided in the Node B, the TSN information can be forwarded from the RNC to Node B, or Node B can parse the MAC-es packets to extract the TSN information. Preferably, the Node B functionality is enhanced to allow for extraction of MAC-es header information directly at Node B.

For the sake of completeness, although not envisioned in the near future in HSPA and LTE like systems, the possibility of implementing the scheduling functionality in the RNC should also be mentioned. In future standards, new MAC sub-layers with sequence number information may be introduced and utilized for UE buffer status estimation.

Figure 6:
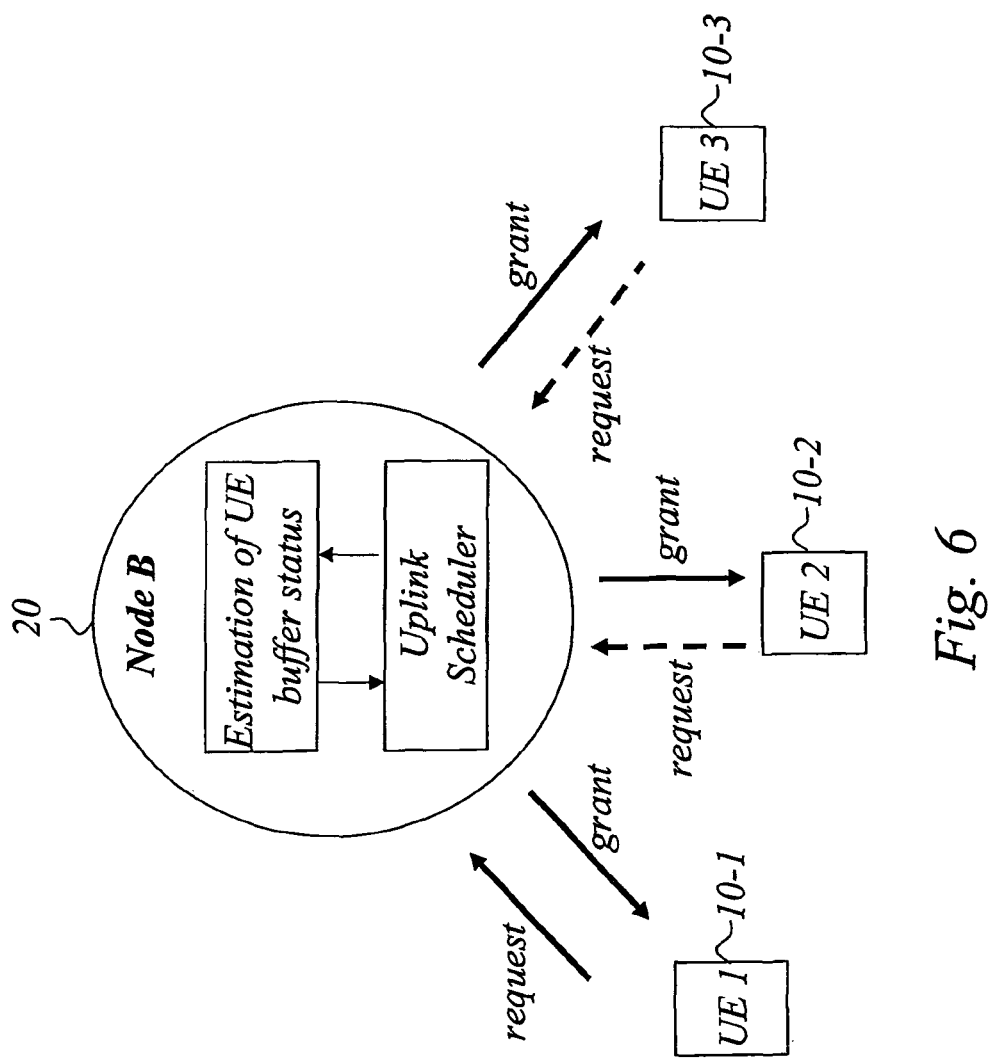
FIG. 6 is a schematic diagram illustrating an example of a Node B unit with estimation of buffer status for improved uplink scheduling according to a preferred exemplary embodiment of the present invention.

FIG. 6 is a schematic diagram illustrating an example of a Node B unit with estimation of buffer status for improved uplink scheduling according to a preferred exemplary embodiment of the present invention. As shown in the example of FIG. 6, the uplink scheduler in Node B 20 works in cooperation with the estimation of UE buffer status like buffer queuing delay and/or available buffer length to allocate grants to UEs 10-1, 10-2, 10-3 in a scheduling round. In this way, improved request-grant scheduling of users for uplink communication can be obtained. Naturally, the module for buffer status estimation may alternatively be integrated into the uplink scheduler, as will be described later on.

In the following, UE buffer status estimation and associated uplink scheduling will be described in greater detail with reference to particular exemplary implementations that operate based on transmission sequence number information.

Network-Based Estimation of UE Buffer Status

Preferably, transmission sequence number information is extracted and stored on the network side per user and logical channel, for subsequent use in estimating buffer status.

Because the TSN field is incremented per logical channel, this idea works well for a single service. The idea also works for multiple services over multiple Radio Access Bearers) RABs. This is because different services are normally mapped to different logical channels.

For example, a table may be created at Node B per user (UE ID) and logical channel (Logical channel ID), which will be updated when each MAC-e PDU is received. An example of such a table, especially suitable for VoIP users, is shown in FIG. 7. In this table, Time_Base denotes the time when the latest silence or talk period started. FRS denotes the first received MAC-es sequence number during the latest silence or talk period, and LRS denotes the largest received MAC-es sequence number in this period. So, basically Time_Base is updated per talk or silence period, while FRS and LRS are preferably updated per TTI.

As an example, the UE buffer queuing delay may be estimated by:

$$Queuing\_Delay = Time\_Current - ((LRS - FRS) \times K \times Frame\_Interval + Time\_Base),$$

where Time_Current represents current time, K represents the number of radio link control (RLC) packet data units (PDUs) included in a Medium Access Control (MAC) packet data unit (PDU) (here exemplified by MAC-es PDU, generally it can be assumed that the same number of RLC PDUs will be included in one MAC-es PDU for VoIP traffic during one talk or silence period), Frame_Interval represents a known frame interval (e.g. for VoIP packets).

For example, if Flag represents a talk period, the variable Frame_interval is 20 ms, otherwise, Frame_interval is 160 ms.

The MAC-es sequence number typically varies within a window, for example 0-63, then the used sequence number in the above table should be transformed considering the window length and the number of window iterations.

As an example, the available UE buffer length can be estimated by:

$$Buffer\_Length = ((Time\_Current - Time\_Base)/Frame\_interval + 1) - (LRS - FRS + 1) \times K,$$

where Time_Current, LRS, K, Frame_Interval and Time_Base follows the same definition as above. For the case when only a single RLC PDU is included in the MAC-es PDU, K is set to 1. However, there actually exists a scenario with more than one RLC PDUs in the same MAC-es PDU. For example, assume within some talk period, UE receives an enough resource allocation which can hold 2 consecutive RLC PDUs in a TTI for transmission. In such case, K should be set 2.

Additionally, there are also two special scenarios to specify as follows:
1. For example, if Robust Header Compression (RoHC) is not used for VoIP traffic, every VoIP packets in the talk period including IP/UDP/RTP header may have a size which can be hold in more than one consecutive RLC PDUs. In such scenario, K is always set to 1.
2. If the realistic Robust Header Compression (RoHC) is used, about the 2% of the VoIP frames is large enough to be transmitted in 2 consecutive RLC PDUs, and then included in the same MAC-es PDU. For this case, K should be also set to 1.

It should be understood that UE buffer queuing delay and available UE buffer length are closely interrelated.

Figure 8:
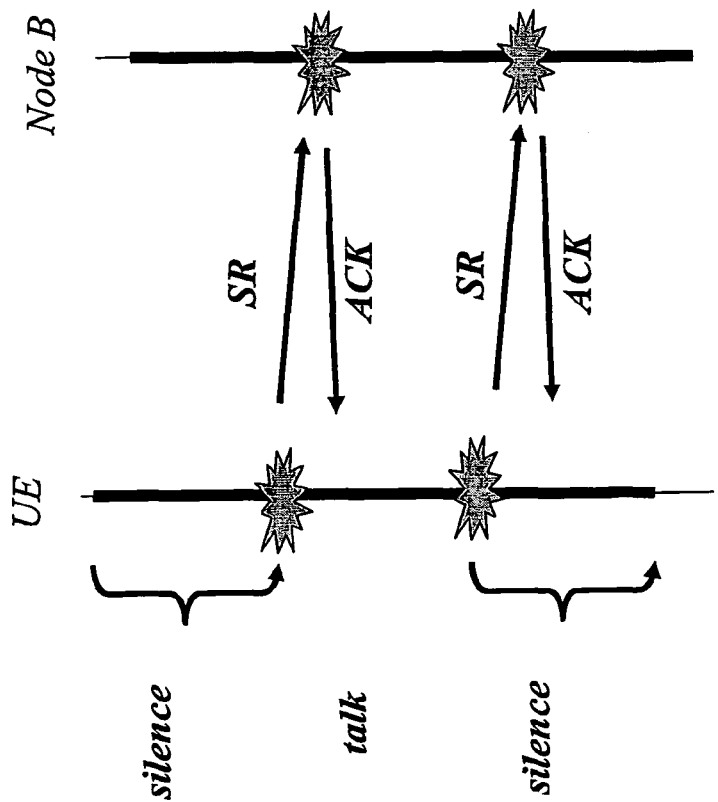
FIG. 8 is a schematic diagram illustrating an exemplary message exchange according to the invention.

To estimate the variable Flag:

As shown in FIG. 8, at the UE side, an in-band Scheduling Request (SR) is triggered by MAC-e if the UE goes into talk spurt or silence spurt. When receiving the SR from UE, Node B decides whether talk spurt or silence spurt is beginning.

To estimate the variable Time Base:

As shown in FIG. 8, at the Node B side, the time base may be approximated as the arrival time of the Scheduling Request (SR).

Improved Uplink Scheduling with Network-Estimated UE Buffer Status

Figure 9:
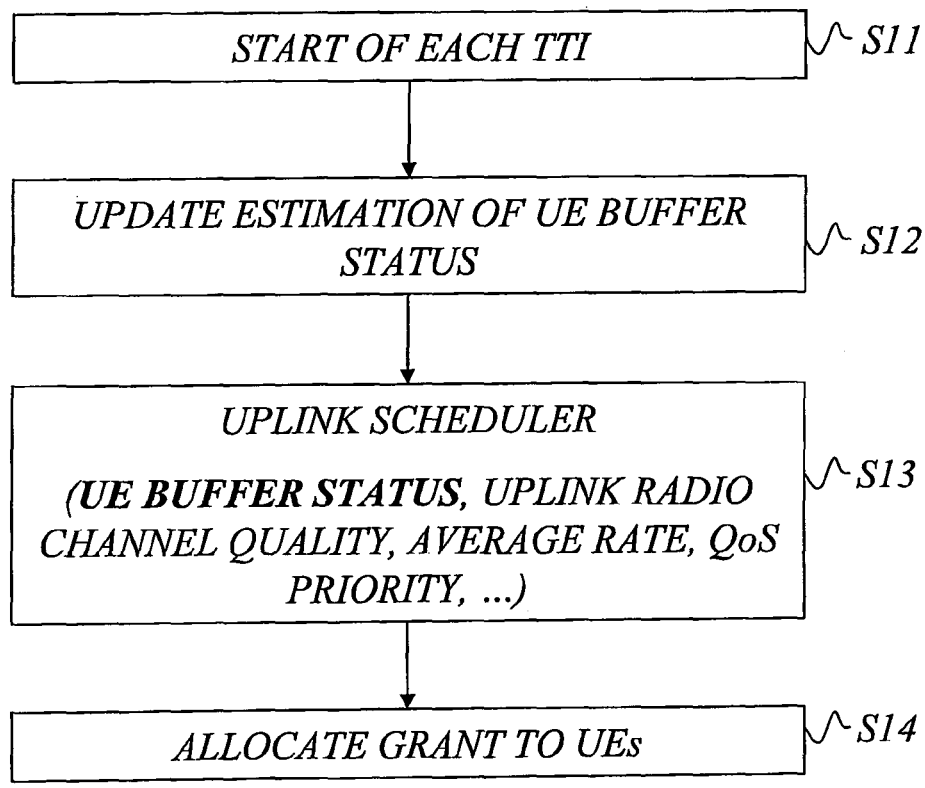
FIG. 9 is a schematic flow diagram illustrating an overall uplink scheduling procedure according to an exemplary embodiment of the invention.

With reference to FIG. 9, at the start of each TTI (S11), the estimation of UE buffer status is performed (S12) to obtain an updated estimate of UE buffer status. Based on the buffer status estimate, and optionally also other factors such as uplink radio channel quality, average rate and QoS priority of the traffic, the uplink scheduler performs uplink scheduling (S13) and allocates grants to UEs accordingly (S14).

In effect, the priority order of users is set considering UE buffer status such as the UE buffer queuing delay. For example, users with longer queuing delay will be given higher priority order. If the system is overloaded, users with smaller queuing delay are typically withdrawn with grant first. If the system has available resources, users with longer queuing delay are granted first. For UE buffer length, users are allocated with grant according to the available UE buffer length.

Although the term "user" is normally considered synonymous to, and occasionally referred to as, mobile, mobile station, user equipment, client, subscriber, remote station, user terminal and so forth, it may also relate to other types of nodes in a wireless network.

In short, the invention does not require any UE buffer reporting and there is no need for any modification of existing standards. The inventive idea is particularly feasible for traffic with fixed frame intervals such as VoIP. As indicated, the functionality of the Node B may have to be improved to support parsing of MAC sub-layer headers, which normally belong to the functionality scope of the RNC.

Implementation Aspects

The functionality of the scheduler may be distributed between several nodes and/or units, or implemented in a single network node such as a network controller or base station (e.g. Node B). The network-based buffer status estimation may be implemented in a separate module connected to the scheduler as illustrated in FIG. 10, or alternatively integrated in the scheduler, as illustrated in FIG. 11.

Figure 10:
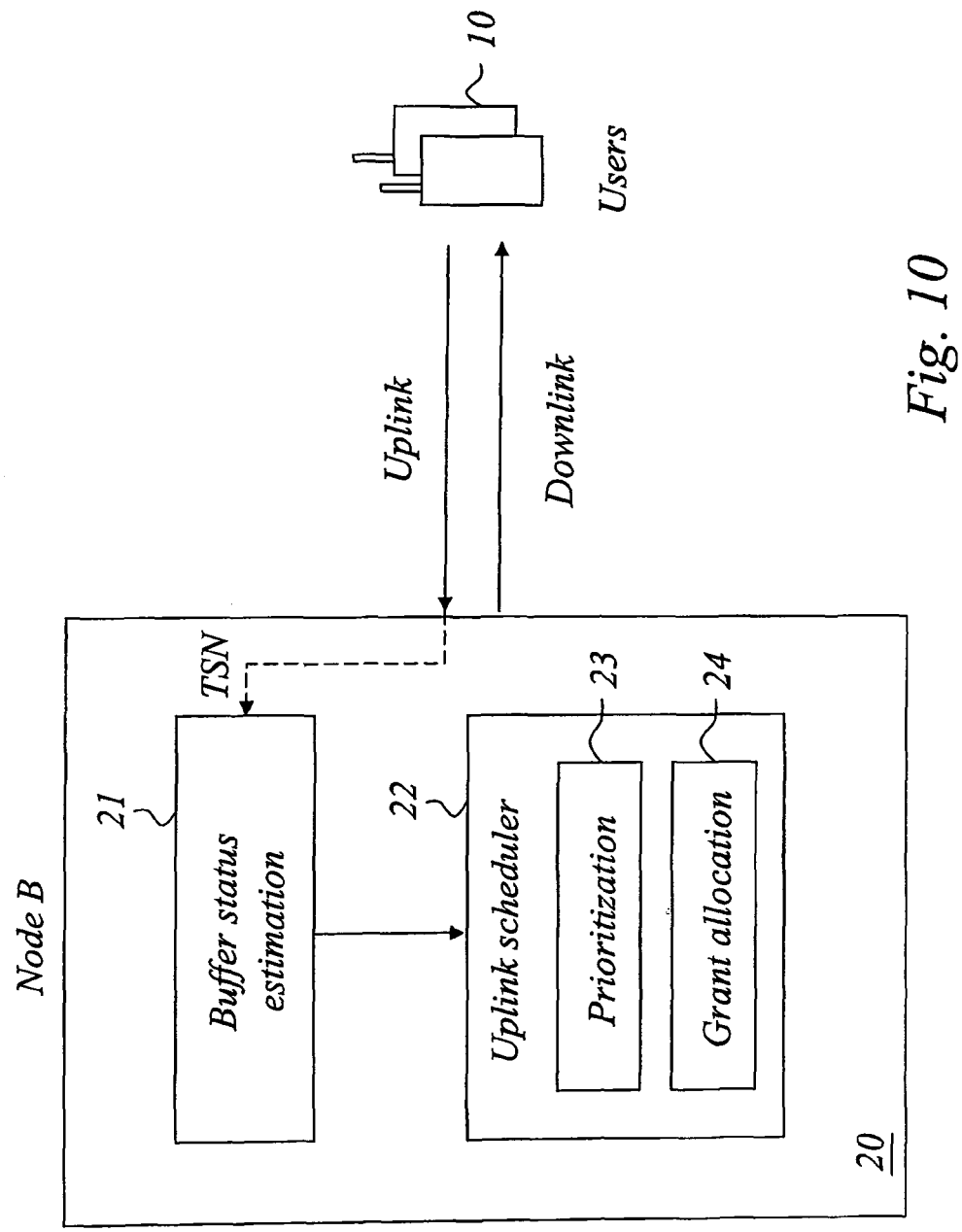
FIG. 10 is a schematic block diagram of a network node such as a Node B configured for improved uplink scheduling according to a preferred exemplary embodiment of the invention.

FIG. 10 is a schematic block diagram of a network node such as a Node B configured for improved uplink scheduling according to a preferred exemplary embodiment of the invention. In this example, the network node is a base station such as Node B 20, which among other components includes a module 21 for buffer status estimation and an uplink scheduler 22. Only those portions of the base station that are relevant to the present invention are illustrated and discussed. The module 21 is configured for estimating the buffer status, for each of a number of users, of the corresponding user equipment (UE) 10. Preferably the buffer status estimation module 21 operates based on Transmission Sequence Number (TSN) information extracted from uplink packet headers. As previously mentioned, the base station 20 may be configured for parsing the packet headers to retrieve the TSN information. The estimated buffer status information is communicated to the uplink scheduler 22. The uplink scheduler 22 includes a prioritization module 23 for determining a scheduling priority order for the users based on the UE buffer status information and a grant allocation module 24 for allocating grants to the users based on the scheduling priority order.

Figure 11:
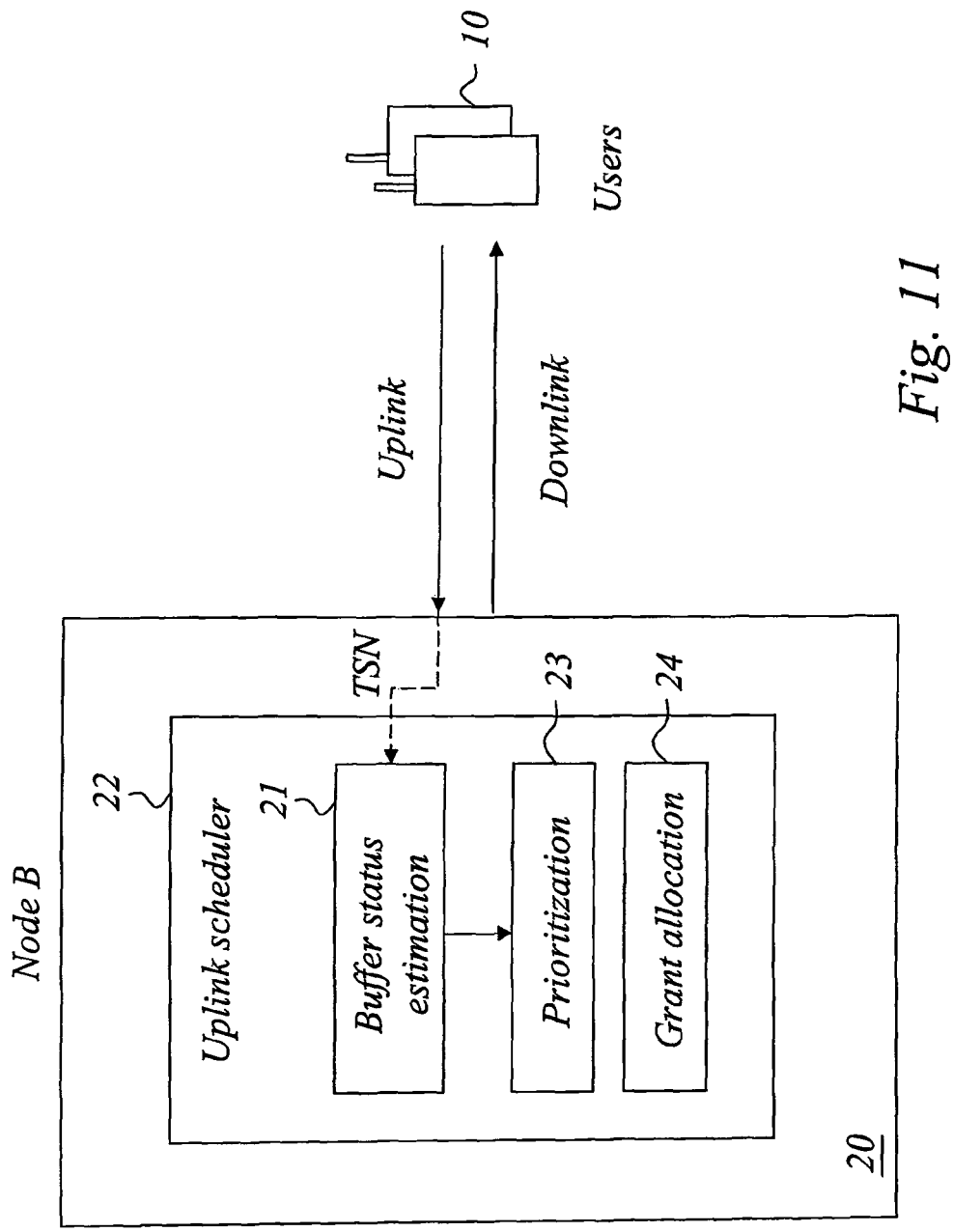
FIG. 11 is a schematic block diagram of a network node such as a Node B configured for improved uplink scheduling according to another preferred exemplary embodiment of the invention.

FIG. 11 is a schematic block diagram of a network node such as a Node B configured for improved uplink scheduling according to another preferred exemplary embodiment of the invention. In this particular embodiment, the module 21 for UE buffer status estimation is integrated into the uplink scheduler 22.

The invention is generally applicable in any communication system having central resource management and user scheduling such as network-based multi-user packet scheduling. In particular, the invention can be applied in the context of a wireless or cellular network with central radio resource management and scheduling in which mobile terminals are scheduled in (downlink) and uplink. The cellular network may be exemplified by a Wideband Code Division Multiple Access (WCDMA) network using Enhanced Uplink (EUL) and High Speed Downlink Packet Access (HSDPA). In another scenario, a Long Term Evolution (LTE) mobile system is considered, where the relevant scheduler works at the unit called eNodeB.

For more information on EUL, reference is made to [4].

The embodiments described above are merely given as examples, and it should be understood that the present invention is not limited thereto. Further modifications, changes and improvements which retain the basic underlying principles disclosed and claimed herein are within the scope of the invention.

ABBREVIATIONS

ARQ Automatic Repeat ReQuest
E-DCH Enhanced Dedicated CHannel
E-DPCCH Enhanced Dedicated Physical Control Channel
E-DPDCH Enhanced Dedicated Physical Data Channel
eNodeB Evolved Node B
EUL Enhanced UpLink
HSDPA High Speed Downlink Packet Access
HS-DSCH High-Speed Downlink Shared CHannel
HSPA High Speed Packet Access
HSUPA High Speed Uplink Packet Access
IMS IP Multimedia Subsystem
LTE Long Term Evolution
MAC Medium Access Control
MMTel MultiMedia Telephony
Node B Name for base station in UMTS
PDU Packet Data Unit
QoS Quality of Service
RLC Radio Link Control
RNC Radio Network Controller
RoHC Robust Header Compression
SR Scheduling Request
TSN Transmission Sequence Number
TTI Transmission Time Interval
UE User Equipment
UMTS Universal Mobile Telecommunication System
UTRAN UMTS Radio Access Network
VoIP Voice over IP
WCDMA Wideband Code Division Multiple Access

REFERENCES

[1] WO-2007090459 A1, Telefonaktiebolaget LM Ericsson (Publ), "Method for Scheduling VoIP Traffic Flows".
[2] EP-1289219 A1, Lucent Technologies Inc, "A method of Scheduling Data Packets for Transmission over a Shared channel, and a Terminal of Data Packet transmission Network".
[3] WO-2007091968 A2, Telefonaktiebolaget LM Ericsson (Publ), "Method and Arrangement for Improving Media Transmission Quality".
[4] 3GPP TS 25.319, "Enhanced Uplink", V8.0.0 (2007-12).

The invention claimed is:

1. A method for network-based uplink scheduling of users for uplink communication between a user side and a network side in a wireless communication network, said method comprising:
   estimating on the network side, for each of a number of users, information representative of buffer status in the corresponding user equipment (UE) based on transmission sequence number information in packets from the user side;
   determining on the network side an uplink scheduling priority order of said users based on said network-estimated buffer status information; and
   allocating on the network side communication resources in said wireless network to said users based on the determined uplink scheduling priority order.

2. The method of claim 1, wherein estimating buffer status information is performed at a network node on the network side.

3. The method of claim 1, wherein estimating buffer status information involves continually tracking UE buffer status.

4. The method of claim 1, wherein estimating buffer status information includes determining an estimate of buffer status based on a difference between a largest received sequence number and a first received sequence number associated with a given silence or talk period, per user and logical channel.

5. The method of claim 1, wherein said transmission sequence number information is extracted from a MAC (Medium Access Control) sub-layer.

6. The method of claim 1, further comprising maintaining, on the network side, updated transmission sequence number information per user and logical channel, for use in estimating buffer status.

7. The method of claim 1, wherein said information representative of buffer status includes at least one of information on UE buffer queuing delay and information on available UE buffer length.

8. The method of claim 7, wherein said information representative of buffer status includes information on UE buffer queuing delay, and said determining a scheduling priority order includes assigning higher priority to users having longer queuing delays.

9. The method of claim 8, wherein the UE buffer queuing delay is estimated as:

$$\text{Queuing\_Delay} = \text{Time\_Current} - ((\text{LRS} - \text{FRS}) \times K \times \text{Frame\_Interval} + \text{Time\_Base})$$

where Time_Current represents a current time, Time_Base represents a time when a silence or talk period starts, FRS represents a first received sequence number during said silence or talk period, LRS represents a largest received sequence number during said silence or talk period, K represents the number of radio link control (RLC) packet data units included in a medium access control (MAC) packet data unit, and Frame_Interval represents a known frame interval.

10. The method of claim 7, wherein said information representative of buffer status includes information on available UE buffer length, and said determining a scheduling priority order includes assigning higher priority to users having more available buffer length.

11. The method of claim 10, wherein the available UE buffer length is estimated as:

$$\text{Buffer\_Length} = ((\text{Time\_Current} - \text{Time\_Base})/\text{Frame\_Interval} + 1) - (\text{LRS} - \text{RFS} + 1) \times K$$

where Time_Current represents a current time, Time_Base represents a time when a silence or talk period starts, FRS represents a first received sequence number during said silence or talk period, LRS represents a largest received sequence number during said silence or talk period, K represents the number of radio link control (RLC) packet data units included in a medium access control (MAC) packet data unit, Frame_Interval represents a known frame interval.

12. The method of claim 1, wherein said uplink scheduling is request-grant scheduling of users wherein scheduling grants are allocated to users at least partly in dependence on said network-estimated buffer status information.

13. The method of claim 1, wherein said communication resources comprise transmission resources of a shared radio medium in a radio access network.

14. The method of claim 1, wherein the estimating information representative of buffer status is performed without consideration of any buffer status report received from the corresponding UE.

15. An arrangement for network-based uplink scheduling of users for uplink communication between a user side and a network side in a wireless communication network, said arrangement implemented in one or more network nodes on the network side, said one or more network nodes configured to:
- estimate, for each of a number of users, information representative of buffer status in the corresponding user equipment (UE) based on transmission sequence number information in packets from the user side;
- determine an uplink scheduling priority order of said users based on said network-estimated buffer status information; and
- allocate communication resources in said wireless network to said users based on the determined uplink scheduling priority order.

16. The arrangement of claim 15, wherein said arrangement is implemented in a network node on the network side.

17. The arrangement of claim 16, wherein said network node is a network controller or a base station.

18. The arrangement of claim 15, wherein said arrangement is configured to continually track UE buffer status.

19. The arrangement of claim 15, wherein said arrangement is configured to extract said transmission sequence number information from a MAC (Medium Access Control) sub-layer.

20. The arrangement of claim 15, wherein said arrangement is configured to maintain, on the network side, updated transmission sequence number information per user and logical channel, for use in estimating buffer status.

21. The arrangement of claim 15, wherein said information representative of buffer status includes at least one of information on UE buffer queuing delay and information on available UE buffer length.

22. The arrangement of claim 15, wherein said arrangement is configured assigning higher scheduling priority to users having longer UE buffer queuing delays.

23. The arrangement of claim 15, wherein the one or more network nodes are configured to estimate information representative of buffer status without consideration of any buffer status report received from the corresponding UE.

24. A scheduling node for network-based uplink scheduling of users for uplink communication between a user side and a network side in a wireless communication network, said scheduling node comprising:
- an estimator configured to estimate, for each of a number of users, information representative of buffer status in the corresponding user equipment (UE) based on transmission sequence number information in packets from the user side;
- a prioritizer configured to determine an uplink scheduling priority order of said users based on said estimated buffer status information; and
- an allocator configured to allocate communication resources in said wireless network to said users based on the determined uplink scheduling priority order.

25. The scheduling node of claim 24, wherein the estimator is configured to estimate information representative of buffer status without consideration of any buffer status report received from the corresponding UE.

* * * * *

UNITED STATES PATENT AND TRADEMARK OFFICE
CERTIFICATE OF CORRECTION

PATENT NO. : 8,437,269 B2
APPLICATION NO. : 12/867891
DATED : May 7, 2013
INVENTOR(S) : Wang et al.

It is certified that error appears in the above-identified patent and that said Letters Patent is hereby corrected as shown below:

In the Specification

In Column 1, Line 33, delete "Enhanced." and insert -- Enhanced --, therefor.

In Column 3, Line 55, delete "in," and insert -- in --, therefor.

In Column 4, Line 48, delete "scheduler:" and insert -- scheduler --, therefor.

Signed and Sealed this
Eighth Day of October, 2013

Teresa Stanek Rea
*Deputy Director of the United States Patent and Trademark Office*